(12) United States Patent
Neven (10) Patent No.: US 11,280,647 B2
(45) Date of Patent: Mar. 22, 2022

(54) MAGNETICALLY-INDUCTIVE FLOW-MEASURING DEVICE, MAGNETIC CIRCUIT DEVICE AND METHOD FOR THE PRODUCTION OF A MAGNETIC CIRCUIT DEVICE

(71) Applicant: Krohne AG, Basel (CH)

(72) Inventor: Joseph Neven, Romans (FR)

(73) Assignee: KROHNE AG, Basel (CH)

( * ) Notice: Subject to any disclaimer, the term of this patent is extended or adjusted under 35 U.S.C. 154(b) by 114 days.

(21) Appl. No.: 16/655,540

(22) Filed: Oct. 17, 2019

(65) Prior Publication Data
US 2020/0124448 A1    Apr. 23, 2020

(30) Foreign Application Priority Data

Oct. 18, 2018  (DE) .................. 10 2018 125 865.8

(51) Int. Cl.
*G01F 1/58*  (2006.01)

(52) U.S. Cl.
CPC .............. *G01F 1/586* (2013.01); *G01F 1/588* (2013.01)

(58) Field of Classification Search
CPC ................................. G01F 1/586; G01F 1/588
See application file for complete search history.

(56) References Cited

U.S. PATENT DOCUMENTS

| | | | |
|---|---|---|---|
| 4,641,537 A | 2/1987 | Hansen et al. | |
| 5,540,103 A | 7/1996 | Zingg | |
| 6,453,756 B2 | 9/2002 | van Willigen | |
| 8,869,628 B2 * | 10/2014 | Neuburger | G01F 1/586 73/861.12 |
| 9,631,961 B2 * | 4/2017 | Profeta, Jr. | G01F 1/584 |
| 2001/0002553 A1 | 6/2001 | Willigen | |
| 2010/0024569 A1 * | 2/2010 | Ehrenberg | G01F 1/586 73/861.12 |
| 2014/0109685 A1 | 4/2014 | Tschudin et al. | |
| 2014/0150567 A1 | 6/2014 | Voigt et al. | |
| 2015/0020607 A1 | 1/2015 | Gao et al. | |
| 2018/0216978 A1 * | 8/2018 | Dames | G01F 15/18 |

FOREIGN PATENT DOCUMENTS

| | | |
|---|---|---|
| DE | 102005063150 A1 | 7/2007 |
| JP | 2004325369 A | 11/2004 |
| WO | 2019052770 A1 | 3/2019 |

* cited by examiner

*Primary Examiner* — Peter J Macchiarolo
*Assistant Examiner* — John M Royston
(74) *Attorney, Agent, or Firm* — David S. Safran; Roberts Calderon Safran & Cole, P.C.

(57) ABSTRACT

A magnetically-inductive flow-measuring device, with a measuring tube for guiding an electrically-conductive medium, with a coil for generating a magnetic field that at least partially runs through the measuring tube and with a magnetic circuit device for guiding the magnetic field outside of the measuring tube, the magnetic circuit device has at least one coil core, a first yoke element, a second yoke element, a first pole piece and a second pole piece, the coil core is arranged inside the coil and the measuring tube is arranged between the first pole piece and the second pole piece. To provide a magnetically-inductive flow-measuring device with a magnetic circuit device, the magnetic circuit device is made from an at least partially bent sheet element or from multiple at least partially bent sheet elements.

19 Claims, 8 Drawing Sheets

MAGNETICALLY-INDUCTIVE FLOW-MEASURING DEVICE, MAGNETIC CIRCUIT DEVICE AND METHOD FOR THE PRODUCTION OF A MAGNETIC CIRCUIT DEVICE

BACKGROUND OF THE INVENTION

Field of the Invention

The invention relates to a magnetically-inductive flow-measuring device, with a measuring tube for guiding an electrically-conductive medium, with a coil for generating a magnetic field that at least partially runs through the measuring tube, and with a magnetic circuit device for guiding the magnetic field outside of the measuring tube, whereby the magnetic circuit device has at least one coil core, a first yoke element, a second yoke element, a first pole piece and a second pole piece, whereby the coil core is arranged inside the coil and whereby the measuring tube is arranged between the first pole piece and the second pole piece. Moreover, the invention relates to a magnetic circuit device for a magnetically-inductive flow-measuring device, with at least one coil core, a first yoke element, a second yoke element, a first pole piece and a second pole piece, and a method for the production of a magnetic circuit device.

Description of Related Art

Magnetically-inductive flow-measuring devices of the kind in question have been known for decades in a wide variety of designs from the state of the art. The underlying measuring principle is based on the separation of charge carriers that are moved in a magnetic field. The measuring technology is based on a measuring tube that is made of a non-magnetic material and is insulated electrically on the flow side by an insulating facing from the medium that flows through the measuring tube, and which is run through perpendicular to the direction of flow by a magnetic field that is generated by the coil. If a medium with a minimum electrical conductivity flows through the measuring tube, the charge carriers that are present in the conductive medium are deflected by the magnetic field. On measuring electrodes that are arranged perpendicular to the magnetic field and to the direction of flow, voltage is produced by the charge separation, which voltage is detected with a measuring device and is evaluated as measuring voltage. The measuring voltage is proportional to the flow rate of the charge carriers that are moved with the medium, so that the flow of the medium in the measuring tube can be derived from the flow rate.

The magnetic field that is generated by the coil is guided outside of the measuring tube by the magnetic circuit device. The measuring tube is arranged between the pole pieces of the magnetic circuit device, whereby the pole pieces in the case of the known magnetic circuit devices are preferably designed flat and are arranged parallel to one another. In terms of this application, a pole piece causes the magnetic field lines to be able to exit from the magnetic circuit device in a defined form and serves to separate them. An essentially homogeneous magnetic field is formed between the pole pieces of the magnetic circuit device, which magnetic field runs through the measuring tube. The part of the magnetic circuit device that is located inside the coil is referred to as the coil core and is surrounded by the windings of the coil. Such a part of the magnetic circuit device that is not surrounded by the windings of the coil is referred to as a yoke element and also is not provided for discharging the magnetic field lines. A yoke element is thus a magnetic connecting element that guides only the magnetic field lines and serves to connect the coil core and the pole piece.

Magnetically-inductive flow-measuring devices and in particular the magnetic circuit devices of magnetically-inductive flow-measuring devices are expensive in their design and, because of the large number of elements of a magnetic circuit device, also expensive to assemble. This means a considerable expenditure in terms of time and cost.

SUMMARY OF THE INVENTION

The object of the invention is to provide a magnetically-inductive flow-measuring device with a magnetic circuit device and a magnetic circuit device for a magnetically-inductive flow-measuring device, which can be carried out in an especially simple way and, moreover, economically.

The object is achieved according to the features of the characteristic part of claim 1 in the case of the magnetically-inductive flow-measuring device in question in such a way that the magnetic circuit device is made from an at least partially bent sheet element or from multiple at least partially bent sheet elements. Sheet element is defined here as a metal piece that has a small thickness in comparison to its width and length. Any of the sheet elements has such a geometry that it can unroll in a plane without overlapping. The individual sheet elements can thus, for example, be cut out from a starting sheet and then bent to form the magnetic circuit device.

In the first variant of the magnetically-inductive flow-measuring device, the magnetic circuit device is produced by a single sheet element. In the second variant, the magnetic circuit device is made of multiple sheet elements. The multiple sheet elements are then connected with one another to the magnetic circuit device, which is explained in more detail further below. The entire magnetic circuit device is accordingly made exclusively from one sheet element or multiple sheet elements. This means that both the coil cores and the yoke elements and pole pieces are produced from sheet elements. If the entire magnetic circuit device is made from only a single sheet element, this one sheet element produces both the coil cores and the yoke elements and the pole pieces. The entire magnetic circuit device can be unrolled with no overlapping in a plane—up to the connecting points of the individual sheet elements for the case that the magnetic circuit device is produced from multiple sheet elements that are connected to one another.

The configuration according to the invention has the advantage that an economical magnetic circuit device can be produced in an especially simple way since only sheet elements have to be prepared and bent—and optionally connected to one another. Moreover, the magnetic circuit device saves space and thus makes it possible to produce a compact magnetically-inductive flow-measuring device.

In an especially preferred configuration of the magnetically-inductive flow-measuring device according to the invention, in which the magnetic circuit device is made from a single sheet element, the sheet element has a first pole piece section, a first coil core section, a first yoke element section, a second pole piece section, a second yoke element section, a second coil core section, and a third pole piece section. The individual sections are preferably arranged in the above-mentioned sequence one behind the other and merge into one another or adjoin one another. According to the invention, it is now further provided that the first pole piece section and the third pole piece section together form the first pole piece. The first pole piece is thus designed in two parts. It is further provided that the second pole piece section forms the second pole piece; the second pole piece is thus designed as a single part, unlike the design of the first pole piece. Moreover, in the configuration according to the invention, the first yoke element section forms the first yoke element and the second yoke element section forms the second yoke element. According to the invention, it is further provided that the first coil core section and the second coil core section together form the coil core. The coil core is thus also designed in two parts.

In another configuration of the magnetically-inductive flow-measuring device according to the invention, the magnetic circuit device is made from a first sheet element and a second sheet element. The first sheet element is configured in this connection in such a way that it has a first pole piece section, which forms the first pole piece of the magnetic circuit device. The remainder of the magnetic circuit device is formed by the second sheet element. To this end, the second sheet element has a first coil core section, a first yoke element section, a second pole piece section, a second yoke element section and a second coil core section. The second sheet element is bent in such a way that the first coil core section and the second coil core section together form the coil core of the magnetic circuit device. The first yoke element section forms the first yoke element; the second yoke element section forms the second yoke element. The second pole piece section forms the second pole piece. The first sheet element and the second sheet element are connected to one another in the transition from the first pole piece to the coil core.

In an alternative embodiment of the magnetically-inductive flow-measuring device according to the invention, the magnetic circuit device is made from multiple sheet elements, namely from a first sheet element, a second sheet element and a third sheet element. A part of the elements of the magnetic circuit device is produced by each sheet element. This configuration has the advantage that the mounting of the magnetic circuit device in the magnetically-inductive flow-measuring device is facilitated. In particular, the design of the magnetic circuit device around the coil is facilitated. Since the coil core also is formed by a part of the magnetic circuit device itself, the sheet elements have to be guided at least partially by the coil or by the interior of the coil. This can be carried out in an especially preferred way by the subsequent preferred further development:

In an especially preferred further development of the alternative embodiment, the first sheet element has in succession a first pole piece section, a first coil core section and a first yoke element section.

The second sheet element has in succession a second yoke element section, a second pole piece section and a third yoke element section. The third sheet element has in succession a third pole piece section, a second coil core section and a fourth yoke element section.

Further, in this configuration, it is provided that the first pole piece section and the third pole piece section together form the first pole piece. The first pole piece is thus in turn designed in two parts and is produced by one part of the first sheet element and one part of the third sheet element. The second pole piece is formed by the second pole piece section, is thus configured as a single part and is produced only by the second sheet element. The first coil core section and the second coil core section together form the coil core, which is also designed in two parts and just like the first pole piece is formed by a part of the first sheet element and a part of the second sheet element. Also, the yoke elements are designed in two parts: the first yoke element section and the second yoke element section together form the first yoke element, and the third yoke element section and the fourth yoke element section together form the second yoke element. The first sheet element and the second sheet element are accordingly connected to one another in the area of the first yoke element, and the second sheet element is connected to one another [sic] in the area of the second yoke element.

By such a configuration, an especially simple mounting of the magnetic circuit device is made possible in such a way that the first sheet element and the third sheet element are guided by the interior of the coil in such a way that the coil core sections that form the coil core dwell in the interior of the coil. The yoke element sections that adjoin the coil core sections are preferably accordingly designed in such a way that they can also be run through the interior of the coil. Subsequently, the sheet elements can then be bent around the coil, namely in such a way that the pole piece sections form the first pole piece and the yoke elements are guided around the coil from outside. The second sheet element can then be bent and connected to the first and the third sheet elements in the area of the yoke elements in such a way that the first pole piece and the second pole piece are arranged opposite to one another and parallel to one another, and overall, a magnetic circuit is formed.

An especially preferred configuration of the magnetically-inductive flow-measuring device according to the invention is characterized in that the first pole piece section and the third pole piece section are designed L-shaped and in that the first coil core section and the second coil core section are designed in the shape of strips and are arranged to run parallel to the L-shaft that attaches to the top side of the L-base. The configuration is preferred both for a magnetic circuit device that is made from a sheet element and for a magnetic circuit device that is made from multiple sheet elements.

In another configuration, the second pole piece section that forms the second pole piece is rectangular. Especially preferably, the second pole piece section is square. The configuration is preferred both for a magnetic circuit device that is made from a sheet element and for a magnetic circuit device that is made from multiple sheet elements.

Another preferred configuration, which is used both for a magnetic circuit device that is made from a sheet element and for a magnetic circuit device that is made from multiple sheet elements, is characterized in that the yoke element sections are designed in the shape of strips. It is especially preferred when the coil core sections merge into the yoke element sections, by which it is meant that the coil core sections and the yoke element sections have the same width, and both sections are formed overall by a metal strip of uniform width.

Overall, the magnetically-inductive flow-measuring device according to the invention further has the advantage that for producing the magnetic circuit device, few—preferably one, two or three—sheet elements are required. This ensures that only a few connecting points or none at all are necessary between the sheet elements. Connecting points form a weak point of a magnetic circuit device, since the magnetic field can be disturbed in particular at the connecting points. According to the invention, a magnetic circuit device is provided, or a magnetically-inductive flow-measuring device is provided, which has few discontinuities for the magnetic field. In a preferred configuration, in which the magnetic circuit device is made from multiple sheet elements, the sheet elements are connected flush with one another and thus do not overlap. In an alternative configuration, the sheet elements are connected to one another in an overlapping manner. It is also conceivable that in the case of multiple sheet elements, a part of the sheet elements are connected to one another in an overlapping manner, and the other part of the sheet elements is connected flush with one another. The sheet elements are connected by, for example, welding, clinching or screwing or another known method.

In an especially preferred configuration, the connecting points are provided in the area of the yoke elements of the magnetic circuit device, since here a possible disruption of the magnetic field is most uncritical.

It has been stated above that in the preferred configurations of the coil cores, the magnetic circuit device is designed in two parts, namely by a first coil core section and a second coil core section. In the case of the two-part production of the coil core, in a preferred configuration of the magnetically-inductive flow-measuring device according to the invention, the first coil core section and the second coil core section are arranged with one another in such a way that a gap is produced between the two coil core sections. The lines for the electrodes of the magnetically-inductive flow-measuring device are further preferably guided through these gaps. According to the invention, a secure and, moreover, space-saving guiding of the lines is thus ensured.

In addition to the magnetically-inductive flow-measuring device, the invention also relates to a magnetic circuit device for a magnetically-inductive flow-measuring device. The magnetic circuit device has at least one coil core, a first yoke element, a second yoke element, a first pole piece and a second pole piece.

The object underlying the invention is achieved in the case of the magnetic circuit device according to the invention in such a way that the magnetic circuit device is made from an at least partially bent sheet element or multiple at least partially bent sheet elements.

In especially preferred embodiments of the magnetic circuit device according to the invention, the magnetic circuit device is designed according to one of the configurations described above in connection with the magnetically-inductive flow-measuring device according to the invention. All statements made in connection with the magnetically-inductive flow-measuring device according to the invention in reference to the magnetic circuit device are to be carried over and applied in a corresponding manner to the magnetic circuit device according to the invention and vice versa.

In addition to the magnetically-inductive flow-measuring device and the magnetic circuit device, the invention, moreover, relates to a method for producing a magnetic circuit device for guiding a magnetic field for a magnetically-inductive flow-measuring device with a coil. The magnetic circuit device has at least one coil core, a first yoke element, a second yoke element, a first pole piece and a second pole piece. In the method, the functionally-necessary coil of a magnetically-inductive flow-measuring device is joined together directly with the magnetic circuit device, whereby the coil surrounds the coil core of the finished magnetic circuit device. The method according to the invention is distinguished in that in a separating step, at least one sheet element is cut out from a flat starting sheet, in that in a guiding step, the at least one sheet element is guided by a coil, and in that in a bending step, the at least one sheet element is bent to form the magnetic circuit device.

If the issue is that at least one sheet element is cut out from a starting sheet, then this cutting-out takes place preferably with a method that is known in the area of metal processing. The sheet element can be cut out in particular in a cutting or chip-free manner. For example, the cutting-out is done by laser cutting or punching-out. If the issue is further that at least one sheet element is cut out from a flat starting sheet, then in particular also multiple sheet elements can be cut out from a starting sheet. Multiple sheet elements can then be cut out from a common starting sheet or from multiple starting sheet elements.

In an especially advantageous embodiment of the method, precisely one sheet element is cut out from the starting sheet. The cut-out sheet element has a first pole piece section, a first coil core section, a first yoke element section, a second pole piece section, a second yoke element section, a second coil core section and a third pole piece section. In the bending step, the sheet element is bent in such a way that the first pole piece section and the third pole piece section together form the first pole piece, the second pole piece section forms the second pole piece, the first yoke element section forms the first yoke element, the second yoke element section forms the second yoke element, and the first coil core section and the second coil core section together form the coil core. In the guiding step, the sheet element is guided by the coil in such a way that the two coil core sections are positioned inside the coil in order to be able to form the coil core.

In another preferred embodiment of the method, the magnetic circuit device is made from multiple sheet elements. According to the invention, in the separating step, multiple sheet elements are cut out from a flat starting sheet or from multiple flat starting sheet elements. In the guiding step, at least one of the sheet elements is guided by the coil. According to the invention, in the guiding step, multiple sheet elements, in particular two sheet elements, can also be guided by the coil. In the bending step, the multiple sheet elements are bent to form in each case a partial section of the magnetic circuit device. In a connecting step, the multiple sheet elements are connected to one another to form the magnetic circuit device.

In the connecting step, the sheet elements are in particular welded, screwed or clinched to one another. The invention also includes any other method, however.

A special variant of the method according to the invention is distinguished in that the bending step has multiple partial bending steps. A first number of partial bending steps is executed before the guiding step is executed. After the guiding step, the remaining partial bending steps are executed. Especially preferably, a positive connection between the magnetic circuit device and the coil is produced by the remaining partial bending steps.

In particular, there are now various options for configuring and further developing the magnetically-inductive flow-measuring device according to the invention, the magnetic circuit device according to the invention, and the method for the production of a magnetic circuit device. To this end, reference is made both to the patent claims subordinate to the independent patent claims and to the following description of preferred embodiments with reference to the accompanying drawings.

DETAILED DESCRIPTION OF THE INVENTION

Figure 1A:
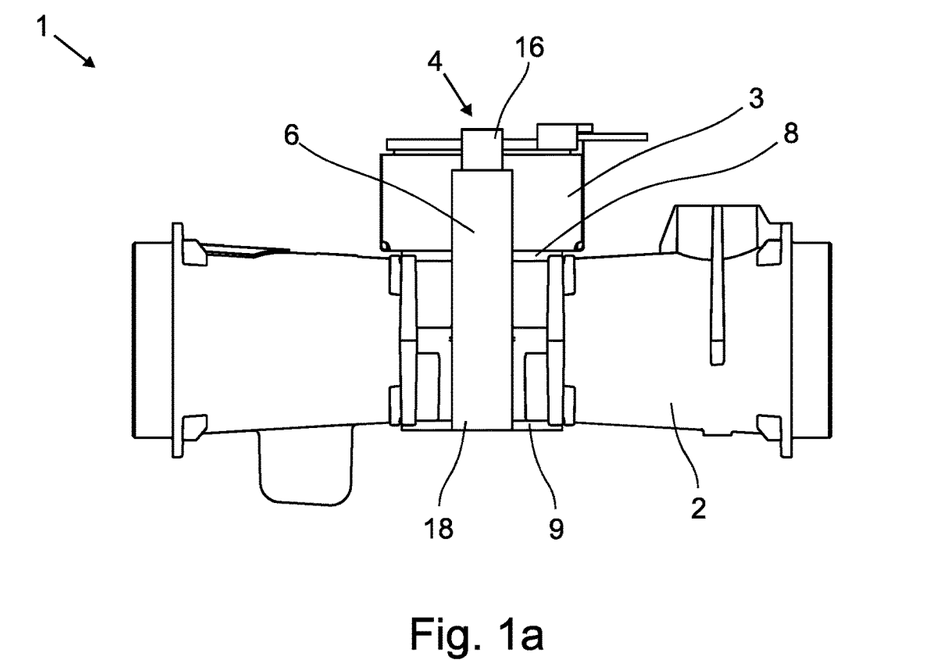
FIG. 1a shows a magnetically-inductive flow-measuring device with a magnetic circuit device in a first view.
Figure 1B:
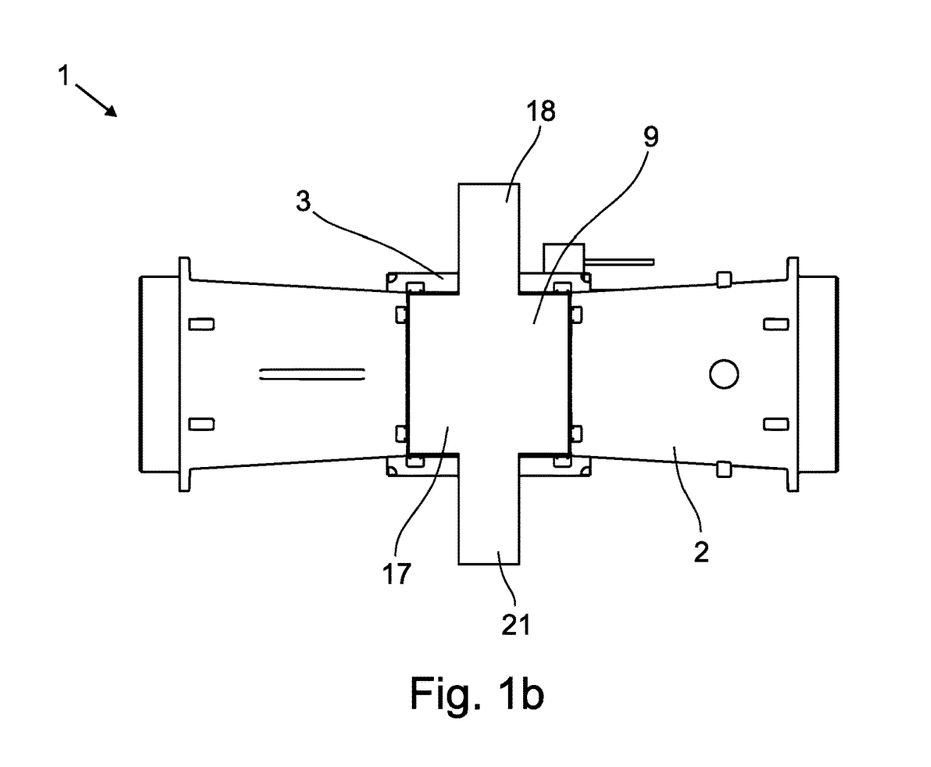
FIG. 1b shows the magnetically-inductive flow-measuring device from FIG. 1a in a second view.
Figure 1C:
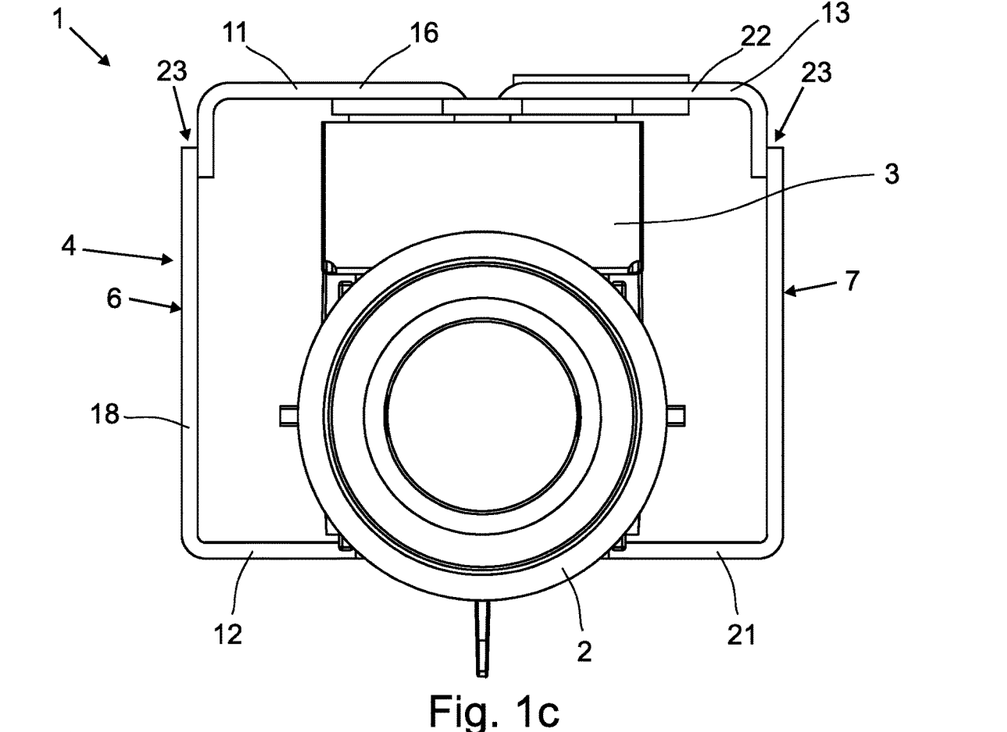
FIG. 1c shows the magnetically-inductive flow-measuring device from FIG. 1a in a third view.

In FIGS. 1a to 1c, a magnetically-inductive flow-measuring device 1 is shown in various views. FIG. 1a shows the magnetically-inductive flow-measuring device 1 in a side view, FIG. 1b shows the magnetically-inductive flow-measuring device 1 from the bottom side, and FIG. 1c shows the magnetically-inductive flow-measuring device 1 in the direction of flow of the medium. The medium flows through the measuring tube 2 and is run through at least partially by a magnetic field, whereby the magnetic field is not depicted. The magnetic field is generated by a coil 3 and guided into the magnetic circuit device 4. The magnetic circuit device 4 has a coil core 5, a first yoke element 6, a second yoke element 7, a first pole piece 8 and a second pole piece 9. The coil core 5 of the magnetic circuit device 2 is the part that is located inside the coil 3 and surrounded by the windings of the coil 3. The yoke elements 6, 7 serve to guide the magnetic field lines, while the pole pieces 8, 9 cause the magnetic field lines to be able to exit from the magnetic circuit device 2 in a defined form. The two pole pieces 8, 9 are arranged opposite to one another and parallel to one another. In the operating state of the magnetically-inductive flow-measuring device 1, an essentially homogeneous magnetic field is generated between the pole pieces 8, 9, which magnetic field runs through the measuring tube 2 that is arranged between the pole pieces 8, 9.

The magnetic circuit device 4 of the magnetically-inductive flow-measuring device 1 is now described based on the following figures.

Figure 2:
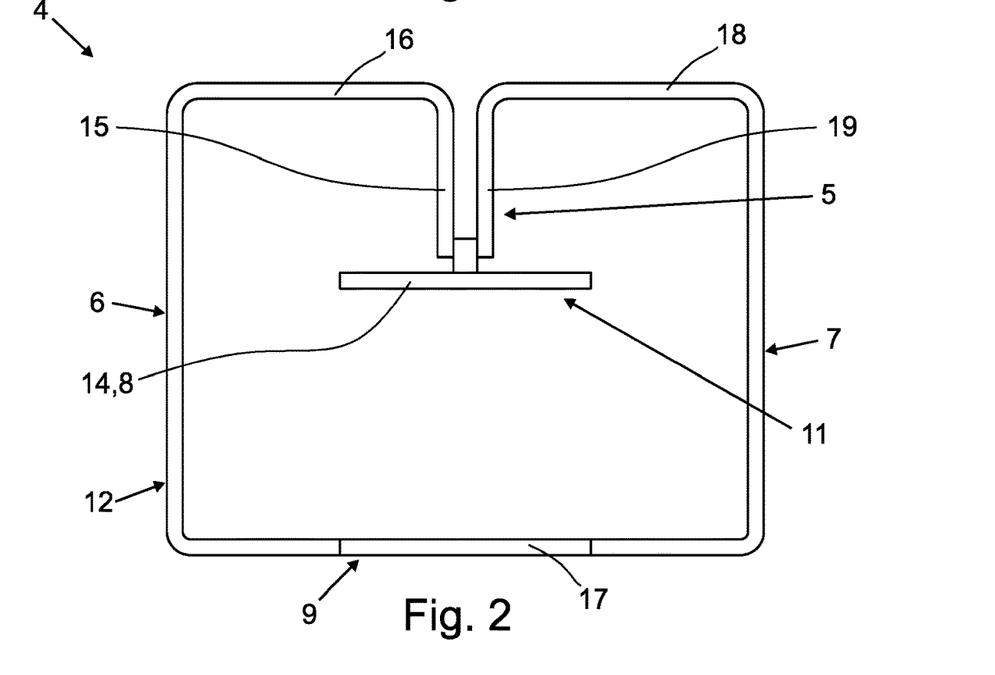
FIG. 2 shows a first configuration of a magnetic circuit device.

FIG. 2 depicts a first variant of a magnetic circuit device 4 for a magnetically-inductive flow-measuring device 1. The magnetic circuit device 4 has a coil core 5, a first yoke element 6, a second yoke element 7, a first pole piece 8 and a second pole piece 9. The entire magnetic circuit device 4 is made from a bent sheet element 10, which has a geometry such that it can be unrolled without overlapping in a plane. The magnetic circuit device 4 can thus be produced in an especially simple and economical way, namely in that a corresponding sheet element 10 is provided, for example, punched out or cut out, and is bent to form the magnetic circuit device 4. In order to be able to produce a complete magnetic circuit device 4, the sheet element 10 in the rolled-out state has in succession a first pole piece section 14, a first coil core section 15, a first yoke element section 16, a second pole piece section 17, a second yoke element section 18, a second coil core section 19 and a third pole piece section 20. The sheet element 10 is then bent so that the first pole piece section 14 and the third pole piece section 20 together form the first pole piece 8, the second pole piece section 17 forms the second pole piece 9, the first yoke element section 16 forms the first yoke element 6, the second yoke element section 18 forms the second yoke element 7, and the first coil core section 15 and the second coil core section 19 together form the coil core 5. In the case of the depicted configuration, both the coil core 5 and the first pole piece 8 are thus designed in two parts.

Figure 3:
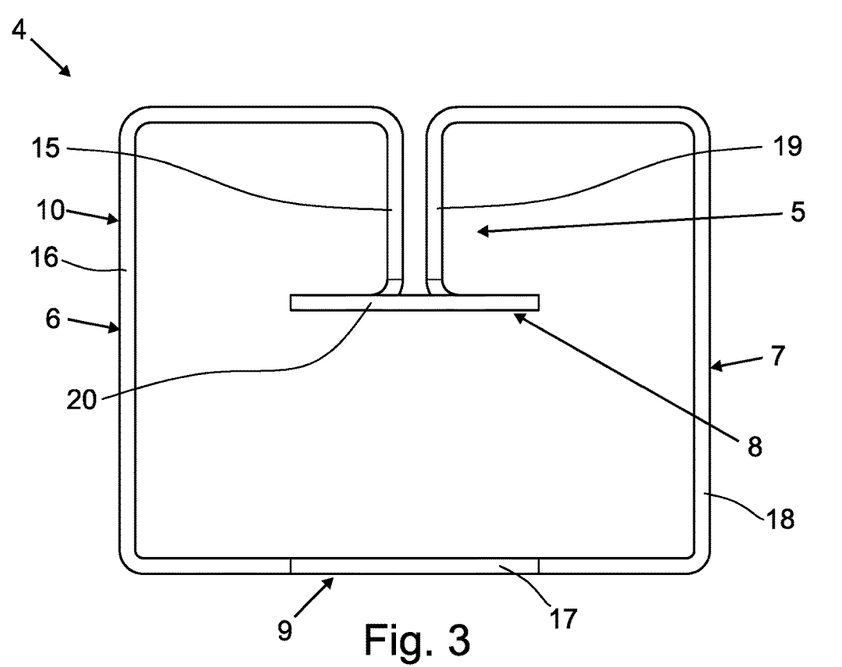
FIG. 3 shows a second configuration of a magnetic circuit device.

FIG. 3 depicts another configuration of the magnetic circuit device 4. The magnetic circuit device 4 that is depicted here differs from the variant depicted in FIG. 2 in that the magnetic circuit device 4 is made from a first sheet element 11 and a second sheet element 12. In this case, the first sheet element 11 is configured so that it has a first pole piece section 14, which forms the first pole piece 8 of the magnetic circuit device 4. The remainder of the magnetic circuit device 4 is made by the second sheet element 12. To this end, the second sheet element has a first coil core section 15, a first yoke element section 16, a second pole piece section 17, a second yoke element section 18 and a second coil core section 19. The second sheet element 12 is bent so that the first coil core section 15 and the second coil core section 19 together form the coil core 5 of the magnetic circuit device 4. The first yoke element section 16 forms the first yoke element 6; the second yoke element section 18 forms the second yoke element 7. The second pole piece section 17 forms the second pole piece 9. The first sheet element 11 and the second sheet element 12 are connected to one another in the transition from the first pole piece 8 to the coil core 5.

Figure 4:
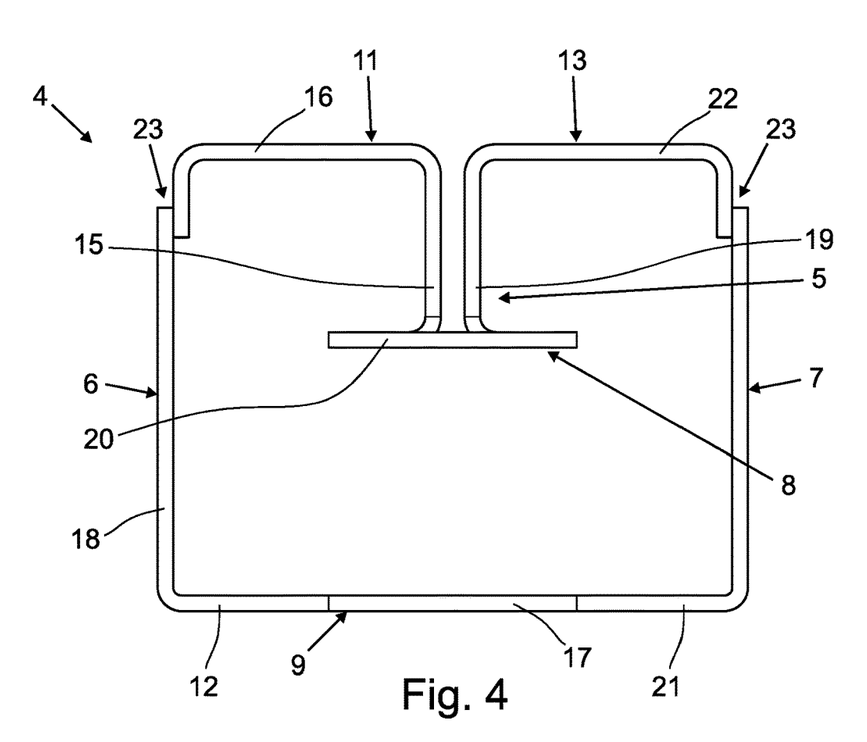
FIG. 4 shows a third configuration of a magnetic circuit device, as also shown in FIGS. 1a-1c.

FIG. 4 shows another configuration of the magnetic circuit device 4. Unlike the magnetic circuit device 4 that is depicted in FIG. 2, the magnetic circuit device 4 that is depicted here consists of a first sheet element 11, a second sheet element 12 and a third sheet element 13, which together form the magnetic circuit device 4. The magnetic circuit device 4 that is shown here corresponds to the magnetic circuit device 4 that is shown in FIGS. 1a to 1c. The first sheet element 11 has in succession a first pole piece section 14, a first coil core section 15 and a first yoke element section 16. The second sheet element 12, however, has in succession a second yoke element section 18, a second pole piece section 17 and a third yoke element section 21, and the third sheet element 13 has in succession a third pole piece section 20, a second coil core section 19 and a fourth yoke element section 22. In the configuration, the first pole piece 8 is made from the first pole piece section 14 and the second pole piece section 20 together. The second pole piece 9, however, is made by the second pole piece section 17. The coil core 5 is also designed in two parts and is made by the first coil core section 15 and the second coil core section 19. Unlike the configuration according to FIG. 2, in this configuration the first yoke element 6 and the second yoke element 7 are also designed in two parts; the first yoke element 6 is namely made by the first yoke element section 16 and the second yoke element section 18, and the second yoke element 7 is made by the third yoke element section 21 and the fourth yoke element section 22. The three sheet elements 11, 12 and 13 are connected to one another at two connecting points 23; the connecting points 23 are located in the area of the first yoke element 6 and the second yoke element 7. The first sheet element 11 and the second sheet element 12 are connected one behind the other in an overlapping manner at the connecting point 23; also, the second sheet element 12 and the third sheet element 13 are connected to one another in an overlapping manner at the other connecting point 23. The configuration according to FIG. 3 has the advantage that the assembly of the entire magnetically-inductive flow-measuring device 1 is considerably simplified by such a magnetic circuit device 2. In particular, the sheet elements 11 and 12 are guided by the interior of the coil 3, namely so that the first coil core section 15 of the first sheet element 11 and the second coil core section 19 of the third sheet element 13 are located inside the coil 3 and are surrounded by the windings of the coil 3. Then, the sheet elements 11 and 13 can be connected to the sheet element 12. In this connection, this makes it possible to match the coil core sections 15, 19 and in a corresponding manner also the yoke element sections 16, 22 to the dimensions of the coil 3, in particular the interior of the coil.

Figure 5A:
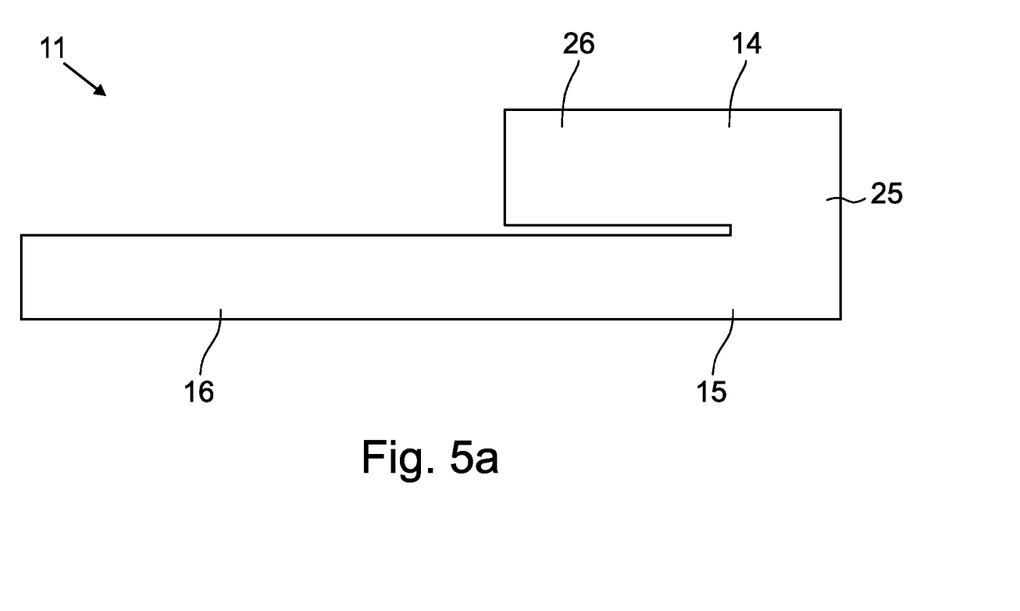
FIG. 5a shows a sheet of a magnetic circuit device in the rolled-out state.
Figure 5B:
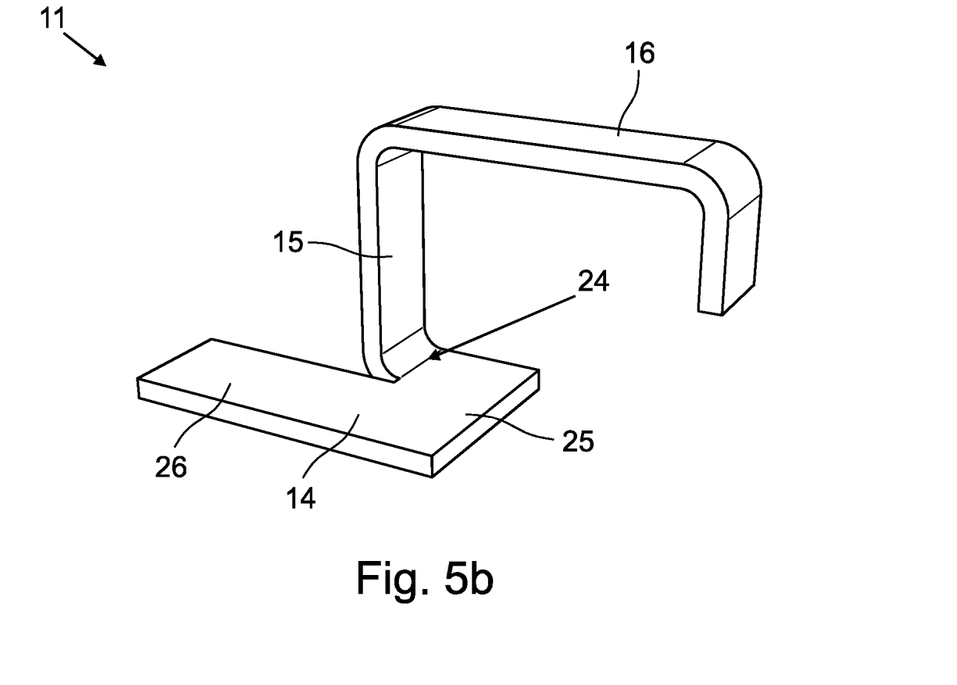
FIG. 5b shows the sheet element of a magnetic circuit device, shown in FIG. 4a, in the bent state.

FIGS. 5a and 5b show a part of the magnetic circuit device 4, namely the first sheet element 11. FIG. 5a shows the sheet element 11 in the unrolled state, whereas FIG. 5b shows the first sheet element 11 in the bent state. The first pole piece section 14, the first coil core section 15 and the first yoke element section 16 are produced by the sheet element 11. The first pole piece section 14 is designed L-shaped having base portion 25 from which a long, narrow shaft portion 26 extends and hereafter referred to as an L-base and L-shaft, which can be seen particularly well in FIG. 5b in the bent configuration. The first coil core section 15, however, is designed in the shape of strips and attaches to the top side 24 of the L-base 25 of the first pole piece section 14. The first coil core section 15 that is in the shape of strips runs parallel to the L-shaft 26 of the first pole piece section 14 and merges into the first yoke element section 16, which is also configured in the shape of strips. The first sheet element 11 and the third sheet element 13 are designed identically.

Figure 6A:
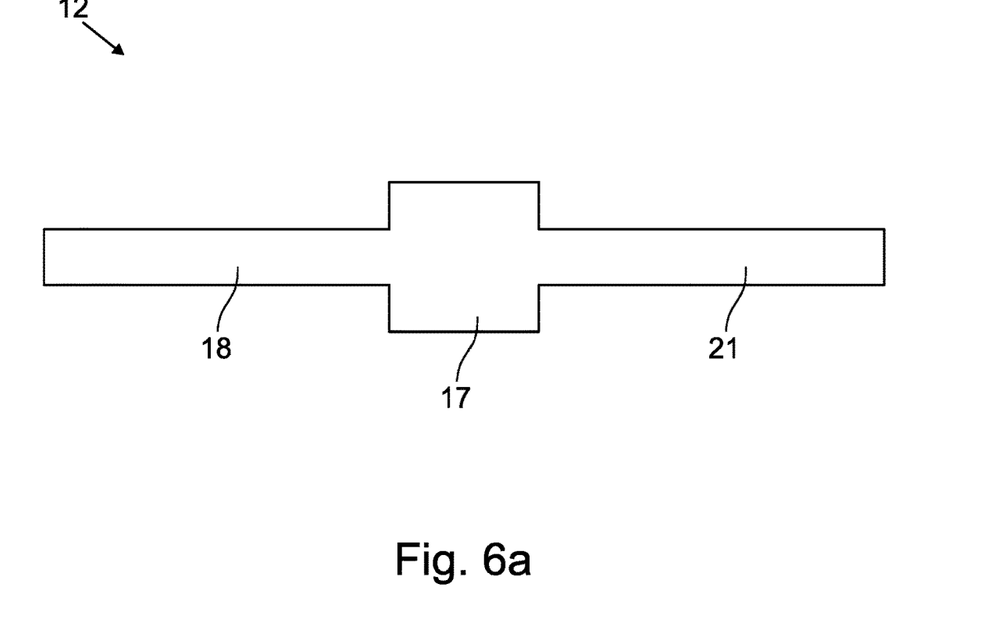
FIG. 6a shows another sheet element of a magnetic circuit device in the rolled-out state.
Figure 6B:
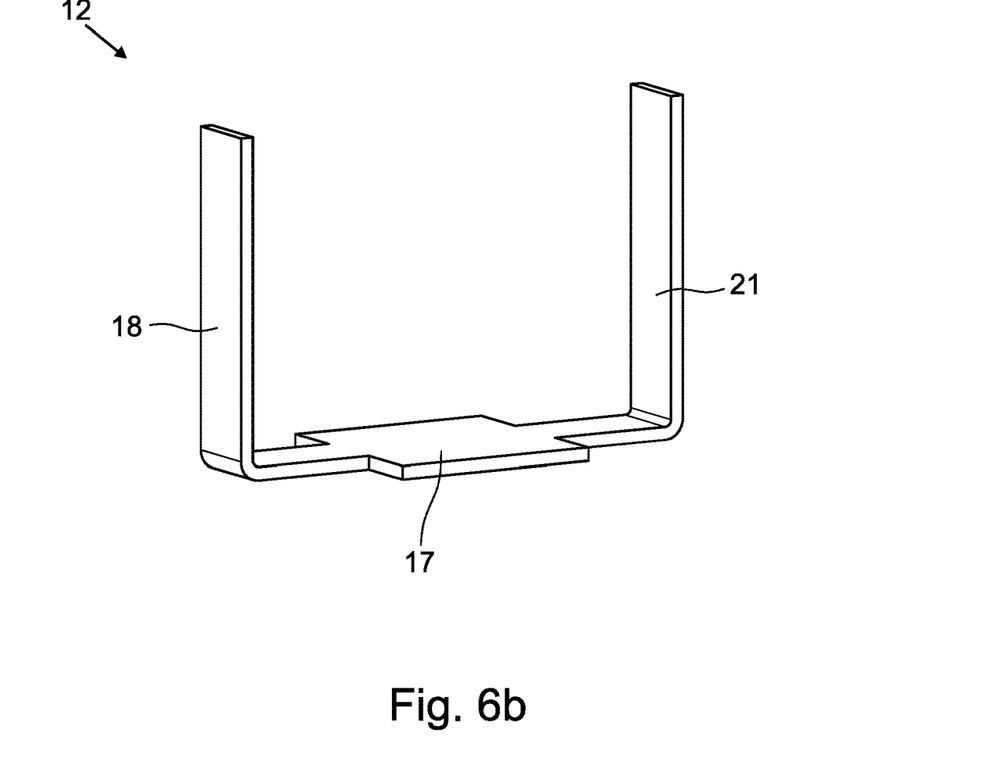
FIG. 6b shows the sheet element, shown in FIG. 5a, in the bent state.

FIGS. 6a and 6b show the second sheet element 12 of the magnetic circuit device 4. FIG. 6a shows the sheet element 12 in the unrolled state, whereas FIG. 6b shows the second sheet element 12 in the bent state. The second yoke element section 18, the second pole piece section 17 and the third yoke element section 21 are produced by the sheet element 12. The second pole piece section 17 also forms the second pole piece 9, as is evident in particular in FIG. 1b. The second pole piece section 17 is square, whereas the two yoke element sections 18 and 21 are designed in the shape of strips.

Figure 7A:
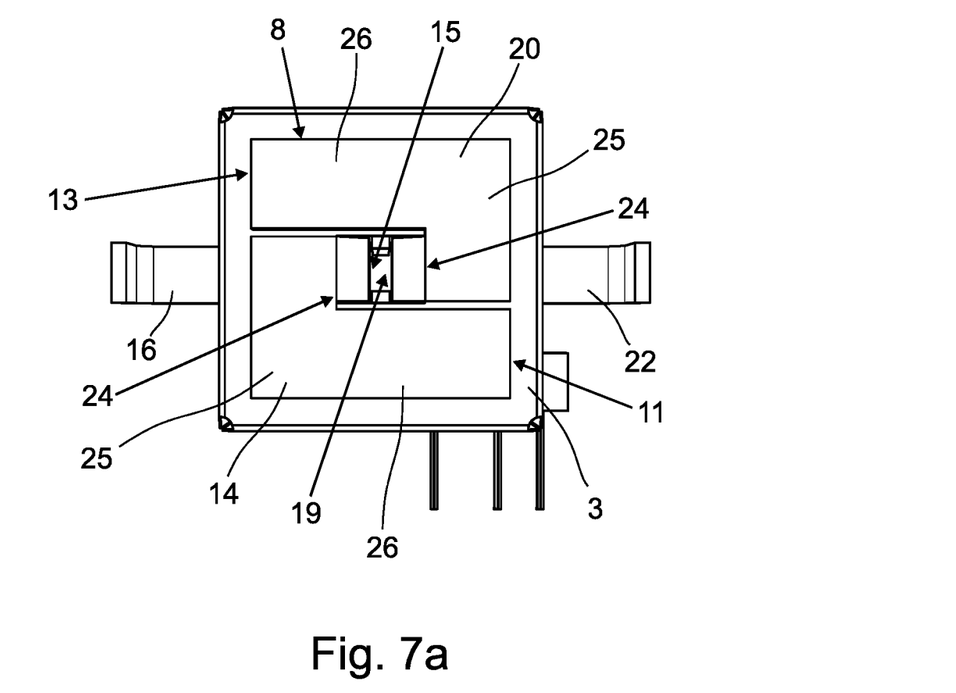
FIGS. 7a-7c show a coil with a part of the magnetic circuit device in three different views.
Figure 7B:
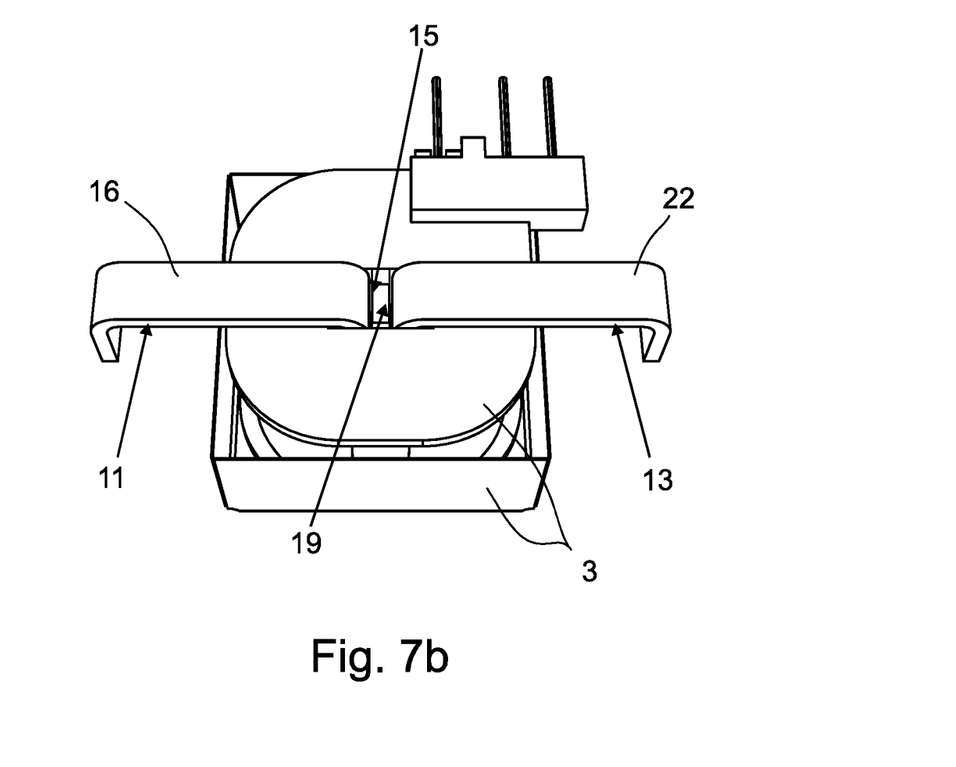
Figure 7C:
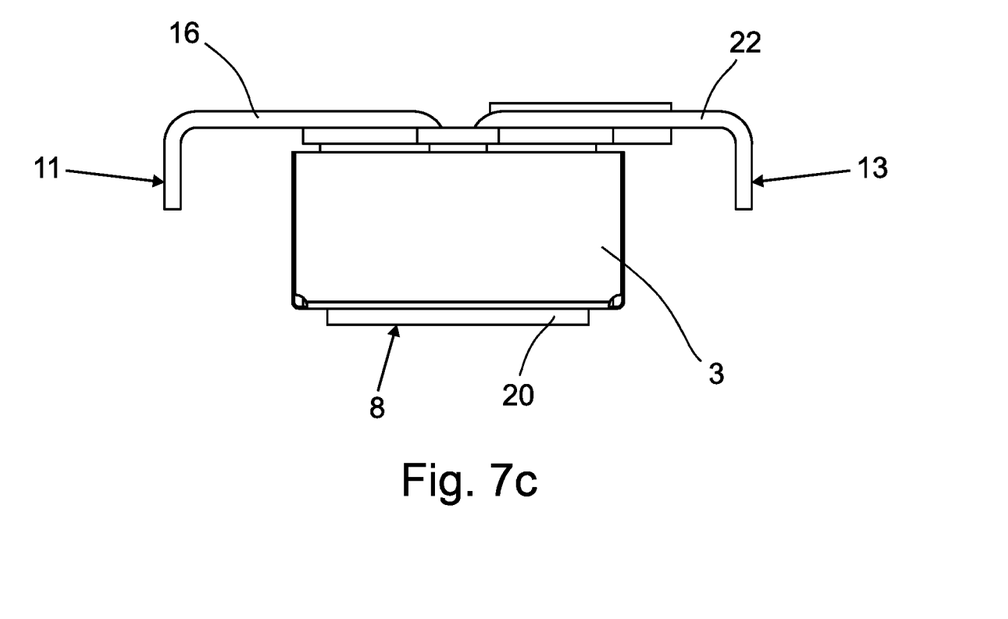

FIGS. 7a to 7c show the coil 3 together with the first sheet element 11 and the third sheet element 13. FIG. 7a shows the side of the coil 3 that faces the measuring tube 2 together with a part of the magnetic circuit device 4, in particular a top view on the first coil core 8, which is made by the first pole piece section 14 of the first sheet element 11 and the third pole piece section 20 of the third sheet element 13. The two L-shaped pole piece sections 14, 20 are arranged relative to one another in such a way that overall, a square pole piece surface is formed. The two top sides 24 of the L-base 25 point toward one another. The coil core sections 15, 19 that adjoin the top sides 24 of the L-base 25 are bent away from the pole piece sections 14, 20 at a 90° angle and are guided by the interior of the coil 3.

FIG. 7b shows the side of the coil 3 that faces away from the measuring tube 2 together with the sheet elements 11 and 13 that exit from the interior of the coil. After the sheet elements 11, 13 are guided by the interior of the coil in such a way that the coil core sections 15, 19 are surrounded by the windings of the coil 3, the yoke element sections 16, 22 that adjoin the coil core sections 15, 19 are also bent at a 90° angle relative to the coil core sections 15, 19. In this way, a positive connection between the magnetic circuit device 4 and the coil 3 is produced. This is evident in particular in FIG. 7c, which shows a side view of the coil 3.

In the figures, the coil 3 consists of a coil box and the actual coil. The precise configuration of the coil 3 is not essential to the invention, however, so that all models of the coil 3 of the invention are included.

Figure 8:
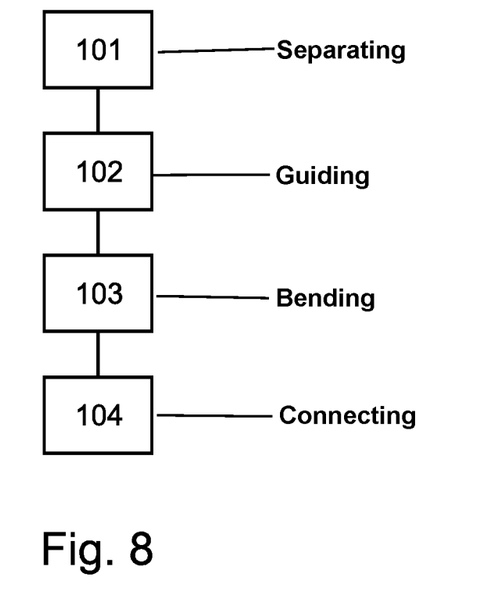
FIG. 8 shows a block diagram of a first method for the production of a magnetic circuit device.

FIG. 8 shows a block diagram of a first method for the production of a magnetic circuit device for a magnetically-inductive flow-measuring device. In a separating step 101, three sheet elements are separated from a starting sheet. In a guiding step 102 that follows the separating step 101, two of the three sheet elements are guided by the interior of a coil. In a subsequent bending step 103, the sheet elements are bent to form the magnetic circuit device. In order to connect the individual sheet elements to one another, a connecting step 104 follows.

Figure 9:
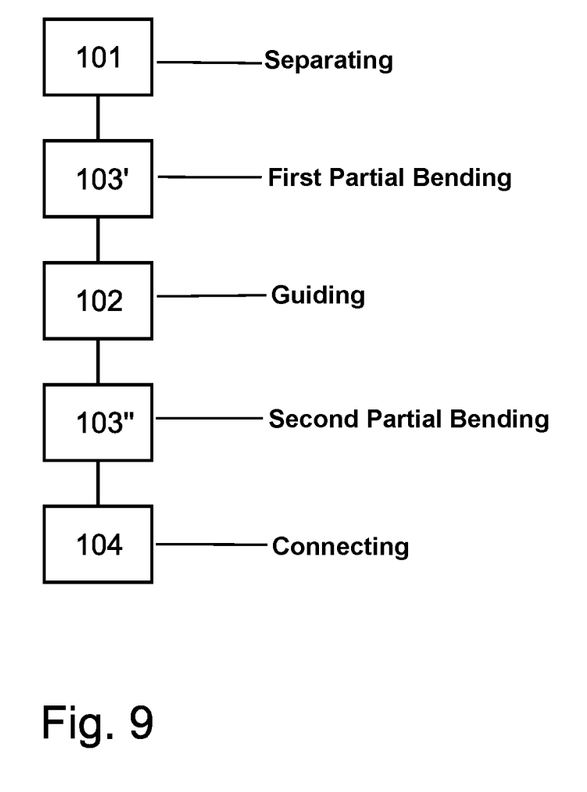
FIG. 9 shows a block diagram of a second method for the production of a magnetic circuit device.

FIG. 9 shows a block diagram of a second method for the production of a magnetic circuit device for a magnetically-inductive flow-measuring device. The method differs from the method depicted in FIG. 8 in that the bending step 103 is performed in two partial bending steps 103' and 103". After the sheet elements are cut out in the separating step 101, the sheet elements are partially bent in the first partial bending step 103'. In the subsequent guiding step 102, the sheet elements are guided at least partially by the interior of the coil. Then, the second partial bending step 103" is carried out. Preferably, in this case, the sheet elements are bent around the coil so that a positive connection between the sheet elements and the coil is produced.

In a connecting step 104, the individual sheet elements are subsequently connected to one another and thus form the magnetic circuit device.

What is claimed is:

1. A magnetically-inductive flow-measuring device, comprising:
   a measuring tube for guiding an electrically-conductive medium;
   a coil for generating a magnetic field that at least partially runs through the measuring tube; and
   a magnetic circuit device for guiding the magnetic field outside of the measuring tube, the magnetic circuit device comprising:
   at least one coil core;
   a first yoke element;
   a second yoke element;
   a first pole piece; and
   a second pole piece,
   wherein the coil core is arranged inside the coil and wherein the measuring tube is arranged between the first pole piece and the second pole piece,
   wherein the magnetic circuit device is made from an at least partially bent sheet element or from multiple at least partially bent sheet elements, wherein the magnetic circuit device is made from a sheet element, the sheet element comprising:
   a first pole piece section;
   a first coil core section;
   a first yoke element section;
   a second pole piece section;
   a second yoke element section;
   a second coil core section; and
   a third pole piece section, wherein the sheet element is bent so that the first pole piece section and the third pole piece section together form the first pole piece, the second pole piece section forms the second pole piece, the first yoke element section forms the first yoke element, the second yoke element section forms the second yoke element, and the first coil core section and the second coil core section together form the coil core.

2. A magnetically-inductive flow-measuring device, comprising:
a measuring tube for guiding an electrically-conductive medium;
a coil for generating a magnetic field that at least partially runs through the measuring tube; and
a magnetic circuit device for guiding the magnetic field outside of the measuring tube, the magnetic circuit device comprising:
at least one coil core;
a first yoke element;
a second yoke element;
a first pole piece; and
a second pole piece,
wherein the coil core is arranged inside the coil and wherein the measuring tube is arranged between the first pole piece and the second pole piece,
wherein the magnetic circuit device is made from an at least partially bent sheet element or from multiple at least partially bent sheet elements, wherein the magnetic circuit device is configured from two sheet elements, wherein the first sheet element has a first pole piece section and forms the first pole piece, and wherein the second sheet element comprises:
a first coil core section;
a first yoke element section;
a second pole piece section;
a second yoke element section; and
a second coil core section, and wherein the second sheet element is bent so that the first coil core section and the second coil core section together form the coil core, the first yoke element section forms the first yoke element, and the second yoke element section forms the second yoke element.

3. A magnetically-inductive flow-measuring device, comprising:
a measuring tube for guiding an electrically-conductive medium;
a coil for generating a magnetic field that at least partially runs through the measuring tube; and
a magnetic circuit device for guiding the magnetic field outside of the measuring tube, the magnetic circuit device comprising:
at least one coil core;
a first yoke element;
a second yoke element;
a first pole piece; and
a second pole piece,
wherein the coil core is arranged inside the coil and wherein the measuring tube is arranged between the first pole piece and the second pole piece,
wherein the magnetic circuit device is made from an at least partially bent sheet element or from multiple at least partially bent sheet elements, wherein the magnetic circuit device is made from a first sheet element, a second sheet element and a third sheet element and wherein the first sheet element has in succession a first pole piece section, a first coil core section and a first yoke element section, wherein the second sheet element has in succession a second yoke element section, a second pole piece section and a third yoke element section, wherein the third sheet element has in succession a third pole piece section, a second coil core section and a fourth yoke element section, wherein the first pole piece section and the third pole piece section together form the first pole piece, wherein the second pole piece section forms the second pole piece, wherein the first coil core section and the second coil core section together form the coil core, wherein the first yoke element section and the second yoke element section together form the first yoke element, and wherein the third yoke element section and the fourth yoke element section together form the second yoke element.

4. The magnetically-inductive flow-measuring device according to claim 1, wherein the first pole piece section and a third pole piece section are configured in an L-shape and the first coil core section and the second coil core section are configured as strips and are arranged to run parallel to an elongated narrow portion of the L-shape that attaches to a top side of a base of the L-shape.

5. The magnetically-inductive flow-measuring device according to claim 3, wherein the first pole piece section and the third pole piece section are configured in an L-shape and the first coil core section and the second coil core section are configured as strips and are arranged to run parallel to an elongated narrow portion of the L-shape that attaches to a top side of a base of the L-shape.

6. The magnetically-inductive flow-measuring device according to claim 1, wherein the second pole piece section that forms the second pole piece is rectangular.

7. The magnetically-inductive flow-measuring device according to claim 2, wherein the second pole piece section that forms the second pole piece is rectangular.

8. The magnetically-inductive flow-measuring device according to claim 3, wherein the second pole piece section that forms the second pole piece is rectangular.

9. The magnetically-inductive flow-measuring device according to claim 1, wherein the first yoke element and second yoke element are configured as strips, and the coil core sections merge into at least adjoining yoke element sections.

10. The magnetically-inductive flow-measuring device according to claim 2, wherein the first yoke element and second yoke element are configured as strips, and the coil core sections merge into at least adjoining yoke element sections.

11. The magnetically-inductive flow-measuring device according to claim 3, wherein the first yoke element and second yoke element are configured as strips, and the coil core sections merge into at least adjoining yoke element sections.

12. The magnetically-inductive flow-measuring device according to claim 2, wherein the first sheet element and the second sheet element are connected flush with one another or the first sheet element and the second sheet element are connected to one another in an at least a partially overlapping manner.

13. The magnetically-inductive flow-measuring device according to claim 3, wherein the first sheet element, the second sheet element and the third sheet element are connected flush with one another or the first sheet element, the second sheet element and the third sheet element are connected to one another in an at least partially overlapping manner.

14. A magnetic circuit device for a magnetically-inductive flow-measuring device for guiding a magnetic field, comprising:
at least one coil core;

a first yoke element;
a second yoke element;
a first pole piece; and
a second pole piece;
wherein the magnetic circuit device is made from an at least partially bent sheet element or from multiple at least partially bent sheet elements, wherein the at least one partially bent sheet element comprises:
a first pole piece section;
a first coil core section;
a first yoke element section;
a second pole piece section;
a second yoke element section;
a second coil core section; and
a third pole piece section, wherein the at least one partially bent sheet element is bent so that the first pole piece section and the third pole piece section together form the first pole piece, the second pole piece section forms the second pole piece, the first yoke element section forms the first yoke element, the second yoke element section forms the second yoke element, and the first coil core section and the second coil core section together form the coil core.

15. A magnetic circuit device for a magnetically-inductive flow-measuring device for guiding a magnetic field, comprising:
at least one coil core;
a first yoke element;
a second yoke element;
a first pole piece; and
a second pole piece;
wherein the magnetic circuit device is made from an at least partially bent sheet element or from multiple at least partially bent sheet elements,
wherein the magnetic circuit device is configured from two sheet elements, wherein the first sheet element has a first pole piece section and forms the first pole piece, and wherein the second sheet element comprises:
a first coil core section;
a first yoke element section;
a second pole piece section;
a second yoke element section; and
a second coil core section, and wherein the second sheet element is bent so that the first coil core section and the second coil core section together form the coil core, the first yoke element section forms the first yoke element, and the second yoke element section forms the second yoke element.

16. A magnetic circuit device for a magnetically-inductive flow-measuring device for guiding a magnetic field, comprising:
at least one coil core;
a first yoke element;
a second yoke element;
a first pole piece; and
a second pole piece;
wherein the magnetic circuit device is made from an at least partially bent sheet element or from multiple at least partially bent sheet elements, wherein the magnetic circuit device is made from a first sheet element, a second sheet element and a third sheet element, wherein the first sheet element has in succession a first pole piece section, a first coil core section and a first yoke element section, wherein the second sheet element has in succession a second yoke element section, a second pole piece section and a third yoke element section, wherein the third sheet element has in succession a third pole piece section, a second coil core section and a fourth yoke element section, wherein the first pole piece section and the third pole piece section together form the first pole piece, wherein the second pole piece section forms the second pole piece, wherein the first coil core section and the second coil core section together form the coil core, wherein the first yoke element section and the second yoke element section together form the first yoke element, and wherein the third yoke element section and the fourth yoke element section together form the second yoke element.

17. A method for production of a magnetic circuit device for a magnetically-inductive flow measuring device for guiding a magnetic field with a coil, wherein the magnetic circuit device has at least one coil core, a first yoke element, a second yoke element, a first pole piece and a second pole piece, wherein the coil surrounds the at least one coil core of a finished magnetic circuit device, wherein the magnetic circuit device is made only from sheet material, comprising:
separating at least one sheet element which is cut out from a flat starting sheet in a separating step;
guiding the at least one sheet element through the coil in a guiding step; and
bending the at least one sheet element to form the magnetic circuit device from only said at least one sheet element in a bending step.

18. The method according to claim 17, wherein in the separating step, multiple sheet elements are cut out from a flat starting sheet, wherein in the guiding step at least one of the sheet elements is guided through the coil, and wherein in the bending step the multiple sheet elements are bent to form in each case a partial section of the magnetic circuit device, the method further comprising: connecting the multiple sheet elements to one another to form the magnetic circuit device in a connecting step.

19. The method according to claim 17, wherein the bending step has multiple partial bending steps, and a first number of partial bending steps is executed, wherein when the guiding step is executed, and remaining partial bending steps are executed, a positive connection between the magnetic circuit device and the coil is produced by the remaining partial bending steps.

* * * * *